(12) United States Patent
Wong et al.

(10) Patent No.: US 9,124,488 B2
(45) Date of Patent: Sep. 1, 2015

(54) METHOD AND APPARATUS FOR VISUALIZING THE HEALTH OF DATACENTER OBJECTS

(75) Inventors: Karen Natalie Wong, San Carlos, CA (US); Martin Bednar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 890 days.

(21) Appl. No.: 12/764,169

(22) Filed: Apr. 21, 2010

(65) Prior Publication Data

US 2011/0261055 A1 Oct. 27, 2011

(51) Int. Cl.
*G06T 11/00* (2006.01)
*H04L 12/24* (2006.01)
*G06T 11/20* (2006.01)
*H04L 12/26* (2006.01)

(52) U.S. Cl.
CPC .......... *H04L 41/0609* (2013.01); *G06T 11/206* (2013.01); *H04L 41/22* (2013.01); *H04L 43/067* (2013.01)

(58) Field of Classification Search
None
See application file for complete search history.

(56) References Cited

U.S. PATENT DOCUMENTS

| 6,906,709 | B1 * | 6/2005 | Larkin et al. | 345/419 |
| 7,752,665 | B1 * | 7/2010 | Robertson et al. | 726/23 |
| 2004/0236547 | A1 * | 11/2004 | Rappaport et al. | 703/2 |
| 2004/0257375 | A1 * | 12/2004 | Cowperthwaite | 345/582 |
| 2006/0002409 | A1 * | 1/2006 | Menon et al. | 370/409 |
| 2008/0126858 | A1 * | 5/2008 | Barras | 714/25 |
| 2010/0131946 | A1 * | 5/2010 | Degaonkar et al. | 718/1 |

OTHER PUBLICATIONS

Musa, S.; Parish, D.J.; , "Visualising Communication Network Security Attacks," Information Visualization, 2007. IV '07. 11th International Conference , vol., No., pp. 726-733, Jul. 4-6, 2007.*
Ball, R., Fink, G. A., & North, C. (Oct. 2004). Home-centric visualization of network traffic for security administration. In Proceedings of the 2004 ACM workshop on Visualization and data mining for computer security (pp. 55-64). ACM.*

* cited by examiner

*Primary Examiner* — Daniel Hajnik

(57) ABSTRACT

Embodiments of the present invention provide a dashboard that displays an overview of a datacenter's health which helps prioritize, monitor, and troubleshoot problems. In particular, one embodiment is a method for visualizing the health of datacenter objects which includes displaying datacenter objects on a scatterplot of a dashboard wherein one axis of the scatterplot corresponds to problem severity and another axis of the scatterplot corresponds to time.

40 Claims, 7 Drawing Sheets

METHOD AND APPARATUS FOR VISUALIZING THE HEALTH OF DATACENTER OBJECTS

TECHNICAL FIELD

One or more embodiments of the present invention relate to method and apparatus for visualizing the health of datacenter objects.

BACKGROUND

As a datacenter's virtual infrastructure grows in size and encompasses more and more objects, for example, hardware and virtual machines, the ability to monitor the health of the objects in the virtual infrastructure becomes more and more difficult. Monitoring each object individually, as is typically done today, is no longer a viable option. In addition, existing monitoring solutions, are not scalable, and are difficult to interpret quickly.

Existing monitoring solutions provide dashboards comprised of lengthy lists of "Top" items, much like a financial stock listing. To use the lists, a user must identify a number of items to follow, or identify a value type of interest, and continually scan a flat list to try to understanding what is occurring. While this method may be useful for a small environment or a small list of items, it may quickly encounter a scalability issue. This is because the many lists displayed are often difficult to read at a glance. Instead, they require the user to scan and read each line, and even to scroll the page. Worse still, items that are continually in the top of a list no longer demand attention the next time a user looks at the list.

SUMMARY

One or more embodiments of the present invention solve one or more of the above-identified problems by providing method and apparatus for visualizing the health of datacenter objects. Specifically, one or more embodiments of the present invention provide a dashboard that displays an overview of a datacenter's health which helps prioritize, monitor, and troubleshoot problems. In particular, one embodiment of the present invention is a method for visualizing the health of datacenter objects which comprises displaying datacenter objects on a scatterplot of a dashboard wherein one axis of the scatterplot corresponds to problem severity and another axis of the scatterplot corresponds to time.

DETAILED DESCRIPTION

Three components to prioritizing a problem relating to an object in a datacenter are: (a) determining the importance of the object (i.e., how critical is the problematic object to datacenter operation?); (b) determining the problem's severity (for example and without limitation, is this a total or partial outage? and how many related problems exist?); and (c) determining the problem's duration.

One or more embodiments of the present invention provide method and apparatus that help: (a) identify and prioritize problems to be investigated, and (b) identify objects that may be impacted by a particular problem (such impacted objects are referred to herein as "related objects"). In particular, one or more embodiments of the present invention are method and apparatus for generating interactive visualizations that aid a user, for example and without limitation, a datacenter administrator, to prioritize, monitor and troubleshoot problems.

Apparatus for Data Relating to Problems

Figure 1:
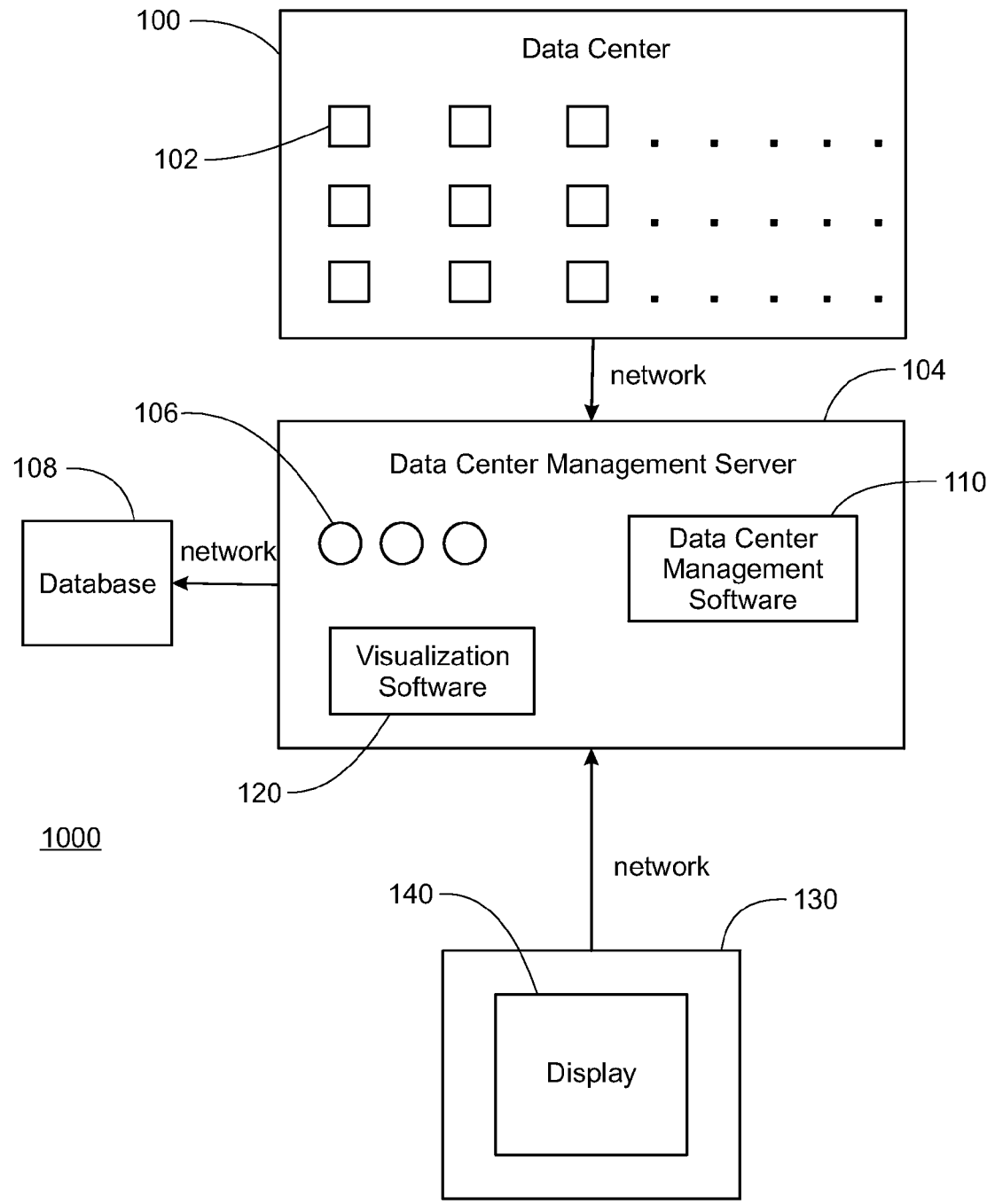
FIG. 1 is a block diagram showing a datacenter management system (DMS) that collects data from objects in a datacenter.

FIG. 1 is a block diagram showing datacenter management system 1000 (DMS 1000) that collects data from objects in datacenter 100, and uses the data to identify problems. As shown in FIG. 1, datacenter 100 is a collection of many objects, including computing resources. For example and without limitation, computing resource 102 in datacenter 100 may be a physical computer system, a virtual computer system (also referred to as a virtual machine (VM)), a network switch, a storage system, or any other resource that is needed to operate datacenter 100. As further shown in FIG. 1, datacenter management server 104 runs datacenter management software 110 (DMS 110), for example and without limitation, VMware vSphere™ 4 software which is available from VMware, Inc. of Palo Alto, Calif. or Microsoft System Center™ software which is available from Microsoft Corporation of Redmond, Wash. As shown in FIG. 1, datacenter management server 104 is connected to datacenter 100 over a network connection, for example and without limitation, a private network connection. DMS 110, among other things, collects health-related data (i.e., data from which health can be determined) from the objects in datacenter 100 (for example and without limitation, computer resource 102)—such data typically includes the date and time the data was gathered. The health-related data is collected from various objects in datacenter 100, for example and without limitation, VMs, physical hosts (i.e., servers), networks, and switches.

DMS 110 analyzes the data and identifies health problems relating to the objects. For example and without limitation, DMS 110: (a) may determine how much CPU and memory is allocated to VMs of a server; (b) may compare the data with performance metrics relating, for example and without limitation, to CPU, memory, disk and network performance; and (c) may monitor the hardware health of servers, including components such as, for example and without limitation, fans, system boards, and power supplies. In addition, DMS 110 may utilize customizable alarm triggers in monitoring objects to provide notification when critical error conditions occur.

DMS 110 running on datacenter management server 104 may periodically query each of its managed objects to retrieve the health-related data. To do this, for example and without limitation, DMS 110 may use one or more agents (for example agent 106 shown in FIG. 1) to provide access for DMS 110 to a particular type of computing resource. Alternatively, agents can be installed in certain types of datacenter objects, and the installed agents will send heath-related data to DMS 110 periodically or at predetermined times or when a particular alarm condition arises. DMS 110 stores the health-related data and any problem indications determined as a result of its analysis (the problem indications also being referred to herein as alerts) in database 108. As shown in FIG. 1, datacenter management server 104 accesses database 108, for example and without limitation, over a network connection, for example and without limitation, a private network connection. For example and without limitation, database 108 may be a relational database management system or any data store that is capable of storing data that can be retrieved using any one of a number of methods that are well known to those of ordinary skill in the art.

In accordance with one or more embodiments of the present invention, visualization software ("VS") that provides inventive visualization and functionality associated therewith runs in a computer system that may be inside or outside datacenter 100. For example and without limitation, as shown in FIG. 1, VS 120 may run on datacenter management server 104. Alternatively, (a) VS 120 may run on any computing resource that can access database 108, for example and without limitation, over a network connection, for example and without limitation, a private network connection; or (b) VS 120 may run on any computer resource that can import data obtained, for example and without limitation, from database 108.

In accordance with one or more embodiments of the present invention, and using any one of a number of methods that are well known to those of ordinary skill in the art, VS 120 accesses data in database 108: (a) that indicates objects in one or more datacenters, for example, datacenter 100, that are unhealthy (along with identifying information such as, for example and without limitation, the type of object); (b) for the unhealthy objects, the data includes alert information with a timestamp indicating when the problem started, for example, when one or more performance metrics deviated from configurable norms by more than configurable tolerances; and (c) data indicating objects that are related to the unhealthy object (for example and without limitation, VMs that access a particular datastore would be considered related). In accordance with one or more embodiments of the present invention, and using any one of a number of methods that are well known to those of ordinary skill in the art, VS 120 accesses database 104 periodically, where the periodicity can be varied in response to user input in accordance with any one of a number of methods that are well known to those of ordinary skill in the art. In addition, and in accordance with one or more further embodiments, for a number of predetermined types of problems (which predetermined problem types are configurable in accordance with any one of a number of methods that are well known to those of ordinary skill in the art), DMS 110 sends an alarm to VS 120 which, in response to the alarm, accesses database 108 to retrieve information relating to a potentially critical problem.

In accordance with one or more embodiments of the present invention, a user connects to VS 120 over a private network connection using a browser in accordance with any one of a number of methods that are well known to those of ordinary skill in the art. In response, and in accordance with one or more such embodiments, VS 120 interacts with the user through a user interface (UI) in accordance with any one of a number of methods that are well known to those of ordinary skill in the art. In accordance with one or more such embodiments, the user uses a computing resource with a display (shown in FIG. 1 as computer 130 with display 140) such as a desktop computer, a laptop computer, or a mobile device such as, for example and without limitation, a Smartphone to interact with the UI provided by VS 120. In any event, VS 120 scales the display in accordance with any one of a number of methods that are well known to those of ordinary skill in the art to take into account the form factor of the particular device used.

Visualization

One or more embodiments of the present invention are method and apparatus for mapping object importance, problem severity, and problem duration on a dashboard that includes a scatterplot. As used herein, and as used in the art, a dashboard is a term that generally refers to a display on which real time information is collated from various sources, for example and without limitation, in a datacenter. The metaphor of a dashboard is adopted here to emphasize the nature of the data being displayed on a page; it is a real-time analysis as to how a datacenter is operating, just like on an automobile, dashboard real time information is displayed about the performance of that vehicle.

Figure 2:
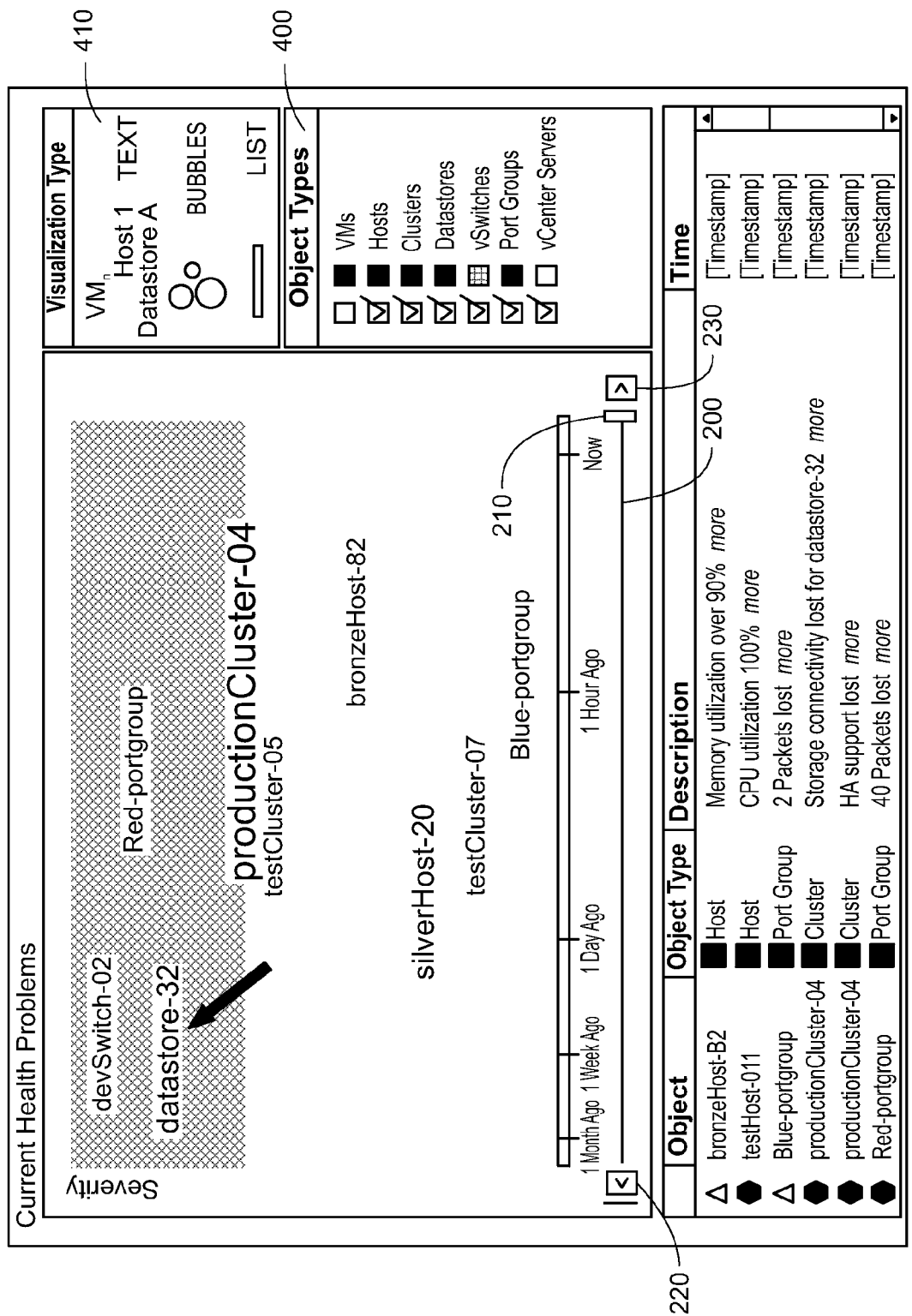
FIG. 2 shows a dashboard that includes a scatterplot, which dashboard is fabricated in accordance with one or more embodiments of the present invention.

FIG. 2 shows a dashboard (also referred to herein as a display) that includes a scatterplot, which dashboard is fabricated in accordance with one or more embodiments of the present invention. In accordance with one or more such embodiments, the vertical axis of the scatterplot corresponds to problem severity (as shown in FIG. 2, the bottom of the vertical axis corresponds to the least severe problem, and the top of the vertical axis corresponds to the most severe problem). As such, in accordance with one or more such embodiments, the upper left hand corner of the dashboard is where the most severe problems appear. In accordance with one or more embodiments of the present invention, problem severity is determined by a metric that relates to an amount by which the state of a datacenter object differs from the state of the datacenter object when it is operating in accordance with predetermined parameters. The following few nonexclusive examples are provided to illustrate problem severity: (a) an unresponsive virtual machine ("VM") in a datacenter would have a higher problem severity than a VM that is working, but with degraded performance; (b) a datastore with space utilization of 99% in a datacenter would have a higher problem severity than a datastore with space utilization of 97%; (c) a host (i.e., a server) in a datacenter with two network interfaces would have a higher problem severity when both network interfaces are inoperative than when only one is inoperative; and (d) a VM in a datacenter having insufficient memory and CPU would have a higher problem severity than a VM lacking just one of such resources. In accordance with one or more such embodiments, the problem severity metric is determined by comparing performance parameters for a datacenter object with ranges of performance parameters stored, for example and without limitation, in tables or rule sets, where the ranges are mapped to values of the problem severity metric. For example and without limitation, the table or rule set may be configurable (it typically is initialized at installation using any one of a number of methods that are well known to those of ordinary skill in the art), and a user such as a datacenter administrator could change the table or rule set data, for example and without limitation, using the UI in accordance with any one of a number of methods that are well known to those of ordinary skill in the art. For example and without limitation, the table or rule sets may be configured by user input to enable the problem severity metrics to better reflect issues that come to light as a result of learning in a real datacenter—such as, for example and without limitation, problem severity metrics that depend on datacenter function or size. For example and without limitation, there could be a scenario where a new problem such as, for example and without limitation, a sudden emergency like a power outage could be the most important problem and as such, its severity would need to be set to a high value. In accordance with one or more further embodiments of the present invention, by scaling severity from "none" to critical, healthy objects (i.e., objects that operate within specified tolerances around pre-determined configurable performance metrics) can be displayed along with "unhealthy" objects. In addition, and in accordance with one or more embodiments of the present invention, problem severity for an object may change over time before it becomes healthy again. For example, and without limitation, problem severity for a CPU may increase as the CPU gets more and more highly utilized over time. In accordance with one or more such embodiments, the problem object will move to a region of higher severity on the scatterplot (for example and without limitation, higher) as the problem severity increases.

In accordance with one or more embodiments of the present invention, the horizontal axis corresponds to time, and the objects are first displayed at a time the object was determined to be unhealthy. Thus, the position of an object vis-á-vis the horizontal axis may provide a measure of problem duration or age (for example and without limitation, as shown in FIG. 2, left on the horizontal axis corresponds to an older problem, and right on the horizontal axis corresponds to a newer problem). As such, in accordance with one or more such embodiments, the horizontal axis becomes an inverse time axis, with new problems appearing from the right. It should be noted that the scatterplot shown in FIG. 2 is shown in one of many possible formats. For example and without limitation, the scatterplot could be shown so that the bottom of the vertical axis relates to the most severe problem. In accordance with one or more further embodiments of the present invention, the horizontal axis may be scaled, for example and without limitation, it may be logarithmically scaled, for example and without limitation, as k*log(t). The use of logarithmic scaling enables more recent times to be examined more fully as more recent times will be given a majority of the scatterplot area. An additional effect of using logarithmic scaling is that problems move more slowly on the left than they do on the right.

Figure 3:
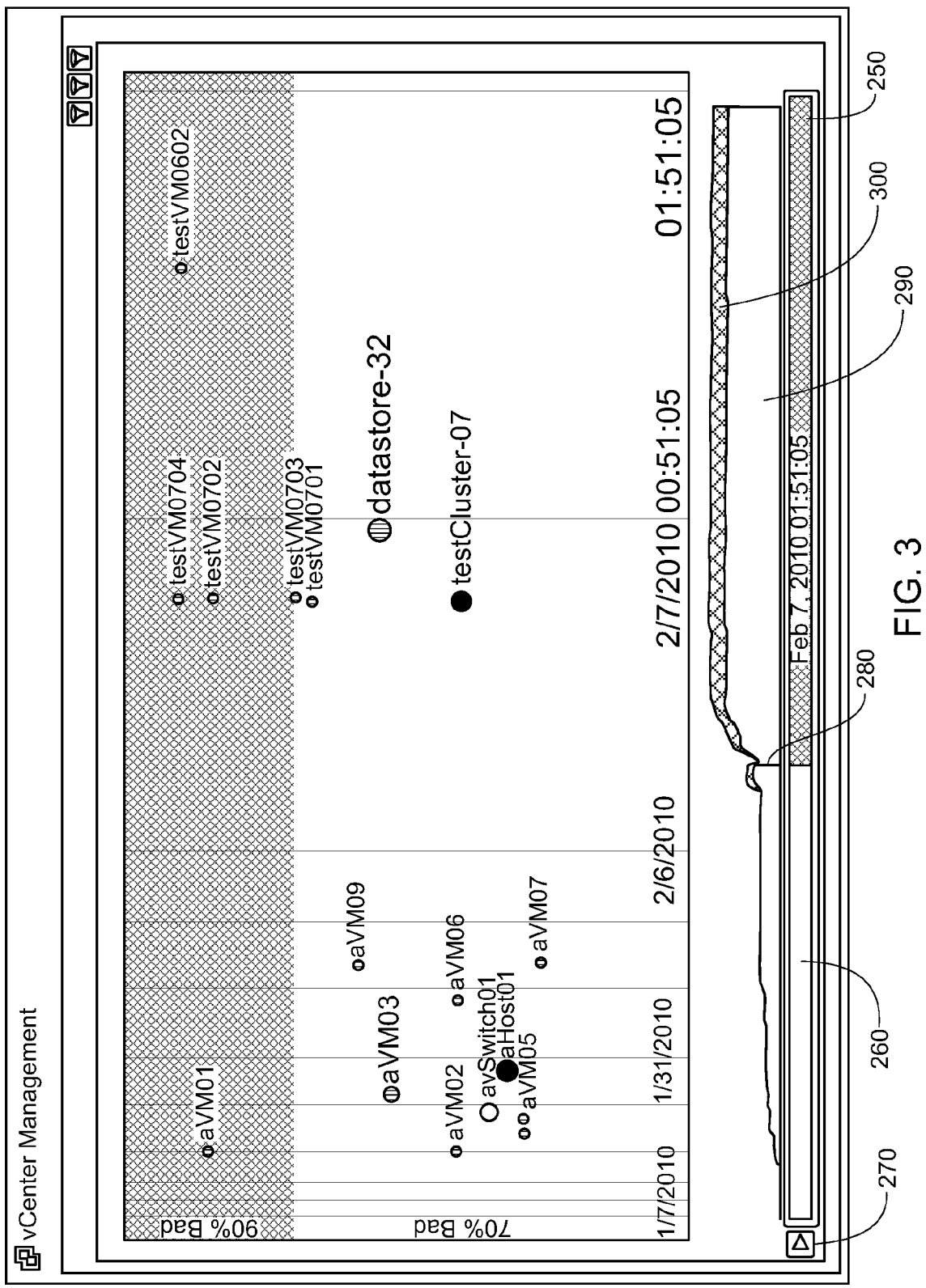
FIG. 3 shows a portion of a dashboard that includes a scatterplot and a stacked chart, which dashboard is fabricated in accordance with one or more further embodiments of the present invention.

In accordance with one or more embodiments of the present invention, and as shown in FIG. 2, a time slider is disposed on the dashboard, for example and without limitation, underneath the scatterplot using any one of a number of methods that are well known to those of ordinary skill in the art. As shown in FIG. 2, the time slider includes horizontal line 200, time indicator 210 disposed thereon, and time slider buttons 220 and 230 disposed at either end of line 200. The time slider shown in FIG. 2 enables a user: (a) to return to a point in time, for example and without limitation, when a specific problem started (i.e., was detected), by moving time indicator 210 to the left—the left corresponds to earlier times—(time indicator 210 may be moved to the left by clicking time slider button 220 or by "dragging" time indicator 210 to the left, which operations are implemented using any one of a number of methods that are well known to those of ordinary skill in the art), and (b) to provide a replay that shows how the problem developed and spread (i.e., caused problems to other objects) by moving time indicator 210 to the right—the right corresponds to more recent times—(time indicator 210 may be moved to the right by clicking time slider button 230 or by "dragging" time indicator 210 to the right, which operations are implemented using any one of a number of methods that are well known to those of ordinary skill in the art). FIG. 3 shows a portion of a dashboard that includes a scatterplot, which dashboard is fabricated in accordance with one or more further embodiments of the present invention. As shown in FIG. 3, a time slider is disposed, for example and without limitation, underneath the scatterplot using any one of a number of methods that are well known to those of ordinary skill in the art. As further shown in FIG. 3, the time slider includes horizontal bar 250 and inner, lighter portion 260 disposed therein. The time slider shown in FIG. 3 enables a user: (a) to return to a point in time, for example and without limitation, when a specific problem started (i.e., was detected), by moving the right-hand edge of portion 260 to the left—the left corresponds to earlier times—(portion 260 may be moved to the left by "dragging," which operation is implemented using any one of a number of methods that are well known to those of ordinary skill in the art), and (b) to provide a replay that shows how the problem developed and spread (i.e., caused problems to other objects) by moving the right-hand edge of portion 260 to the right—the right corresponds to more recent times—(portion 260 may be moved to the right by "dragging," which operation is implemented using any one of a number of methods that are well known to those of ordinary skill in the art).

In accordance with one or more embodiments of the present invention, when a user selects an object with a cursor (for example and without limitation, by clicking a mouse when the cursor is over the object) that is provided using any one of a number of methods that are well known to those of ordinary skill in the art, an indication (for example and without limitation, a point) is placed on the time slider using any one of a number of methods that are well known to those of ordinary skill in the art, which indication identifies when the problem with the object was first detected. In accordance with one or more embodiments of the present invention, the user may move a time indicator (for example and without limitation, time indicator 210 shown in FIG. 2 or the right-hand edge of portion 260 shown in FIG. 3) to the left (for example and without limitation, in the manner described above in conjunction with FIGS. 2 and 3) to show a dashboard that is populated with data from earlier times—when this is done, the "cloud of objects" displayed on the scatterplot is shifted to the right using any one of a number of methods that are well known to those of ordinary skill in the art, and hence, back in time. In accordance with one or more embodiments of the present invention, the user may move the time indicator (for example and without limitation, time indicator 210 shown in FIG. 2 or the right-hand edge of portion 260 shown in FIG. 3) to the right (for example and without limitation, in the manner described above in conjunction with FIGS. 2 and 3) to show data from later times —when this is done, the "cloud of objects" displayed on the scatterplot is shifted to the left using any one of a number of methods that are well known to those of ordinary skill in the art, and more current problems appear. In accordance with one or more embodiments of the present invention, the use of time shifting enables a user to get a hint at cause-and-effect between problems, and to obtain an early indication of the root cause of a problem, and/or how severe a problem may be (for example, if one object is causing several other objects to appear as problems, then it may be more severe). In addition, as the user replays a problem's development over time, the user may also see how it may have begun to "create" other problems. This information is useful in inferring trends or development of problems.

In accordance with one or more embodiments of the present invention, a "time player" acts to replay the scatterplot in accordance with any one of a number of methods that are well known to those of ordinary skill in the art, for example and without limitation, from the problem start time to the present time for a selected object. FIG. 3 shows time player button 270 disposed at the left of bar 250 of a time slider. When the object is selected, for example and without limitation, by clicking a mouse when the cursor is over the object, a point is placed on the time slider, which point indicates a detection time, i.e., a time when the problem with the object was first detected. If the user moves the time indicator (for example, the right-hand edge of portion 260 to that the detection time, by clicking on time player button 270, the display will be shifted to the right to the present time. In accordance with one or more such embodiments, if the horizontal axis of the scatterplot were logarithmically scaled, movement of the slider time indicator may be implemented in at least two ways in accordance with any one of a number of methods that are well known to those of ordinary skill in the art. In the first way, and in accordance with one or more embodiments of the present invention, replay associated with movement of the time indicator is implemented so that replay time runs at a constant rate of speed—as a result, the slider time indicator will move at a first rate of speed, and then speed up to match the time display. In the second way, and in accordance with one or more embodiments of the present invention, replay is implemented so that the slider time indicator moves at a constant rate of speed—as a result, the time display moves at a fast rate of speed in the beginning, and then slows down at more recent times.

In accordance with one or more embodiments of the present invention, the type of problem objects displayed may be selected so as to provide a filter for the display. For example and without limitation, as shown in FIG. 2, the type of problem objects displayed may be selected by clicking on buttons shown on the display in middle right-hand panel 400.

In accordance with one or more embodiments of the present invention, another indicator of priority (object importance) is represented on the scatterplot by the size of a display object on the plot (for example and without limitation, higher importance problems are larger in size). For example and without limitation, as a configurable feature (typically initialized at installation using any one of a number of methods that are well known to those of ordinary skill in the art), the user would enter data, for example and without limitation, into a table in accordance with any one of a number of methods that are well known to those of ordinary skill in the art that associates problems of a particular type with a particular type and size of display object. For example and without limitation, a display object may be a circle, a rectangle, a hexagon, a triangle and so forth. In accordance with one or more further embodiments of the present invention, the type of display object or the color of a display object on the scatterplot may relate to the type of object, for example and without limitation, a virtual machine (VM) or a datastore while, as set forth above, object importance relates to size. In accordance with one or more such further embodiments, the type and/or the color of a display object are configurable parameters.

In accordance with one or more further embodiments, and using any one of a number of methods that are well known to those of ordinary skill in the art, the display objects may comprise text labels which have the name of a problematic object—in a particular case. By replacing points or dots with text labels, users can quickly identify each problem, in context. This also saves the number of drilldown steps needed to identify problems, and provides a better overview of the present situation. However, if the number of objects increases to such an extent that the text overlaps so much that it obscures matters, the text labels can be replaced by more scalable points. For example and without limitation, as shown in FIG. 2, the visualization type for objects may be selected by clicking on buttons shown on the display in top right-hand panel 410. Alternatively, in accordance with one or more further embodiments of the present invention, a "mouse-over" method enables isolation of an object of interest. In accordance with this method, as a cursor moves into a cluster of objects, and hovers over one object (referred to as a "target object"), all other objects in the cluster are moved away from the target object at a user configurable speed using any one of a number of method that are well known to those of ordinary skill in the art. In accordance with one or more such embodiments, a cluster of objects is determined, for example and without limitation, by a user-configurable parameter that indicates a measure of overlap of an object with the target object (i.e., the object over which the mouse hovers). In addition, and in accordance with one or more such embodiments, each object which moves has an "invisible" anchor to its original location, so that it can only be moved limited distance which is, for example and without limitation, user-configurable. If the user moves the cursor faster than the objects move, and hovers over another target object, other objects may now move away from the new target object. When there is no target object in the way of the other objects, the other objects move back to their original locations, for example and without limitation, at a user-configurable speed. This enables objects to maintain their general relative location in the dashboard, and this functionality is useful for providing a contextual understanding of priorities.

Figure 4:
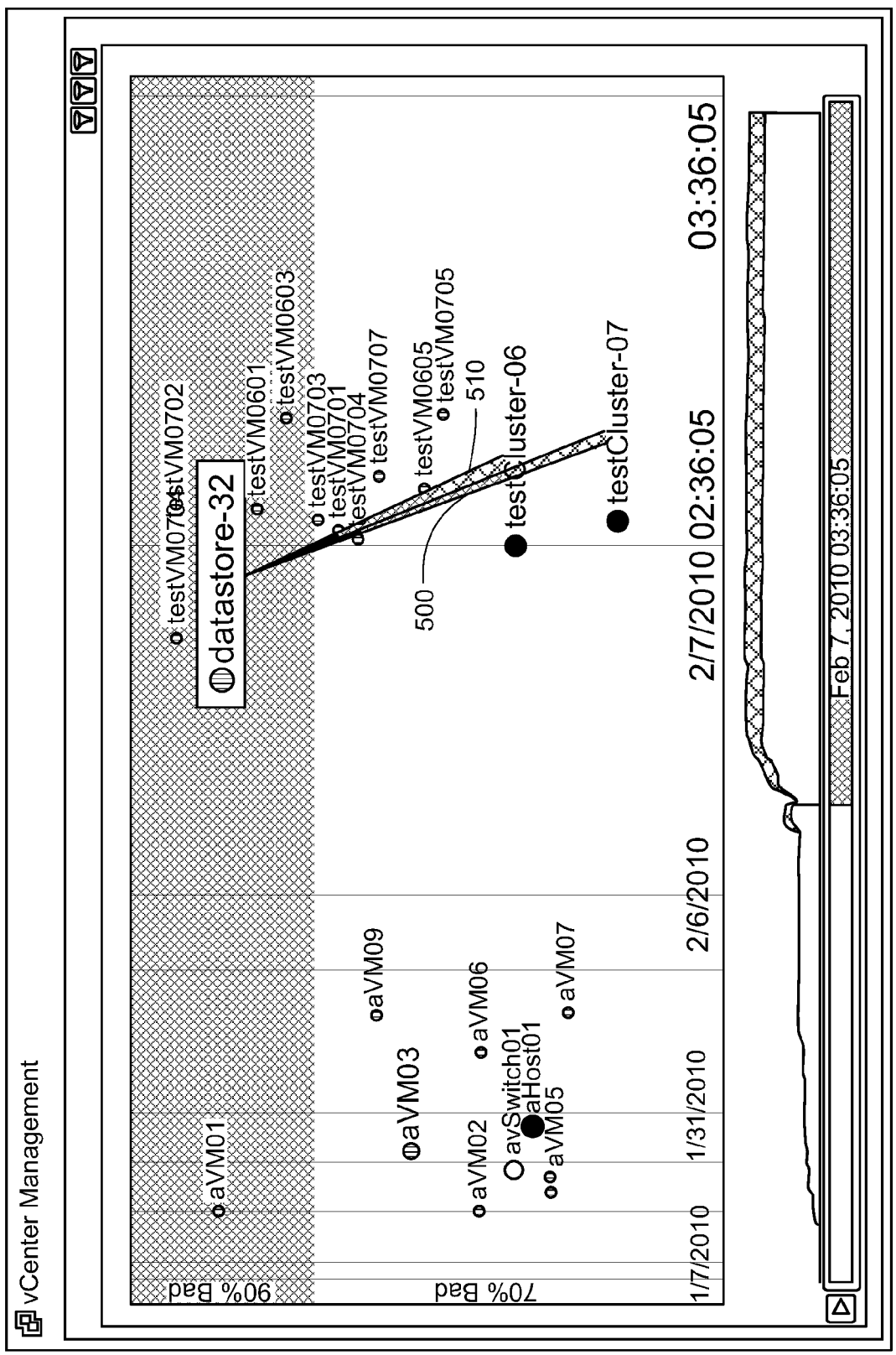
FIG. 4 shows a portion of a dashboard that includes a scatterplot and directed edges, which dashboard is fabricated in accordance with one or more further embodiments of the present invention.

In accordance with one or more embodiments of the present invention, visualization of relationships among objects is created when a user selects an object on the scatterplot (for example and without limitation, by clicking a mouse when a cursor is over the object) by providing directed edges on the scatterplot from the selected object to related objects using any one of a number of methods that are well known to those of ordinary skill in the art (i.e., as long as the related objects are displayed on the scatterplot in a time duration encompassed thereby). For example and without limitation, types of objects that are related may be configurable—typically this data is initialized at installation using any one of a number of methods that are well known to those of ordinary skill in the art, and a user could change this data, for example and without limitation, using the UI in accordance with any one of a number of methods that are well known to those of ordinary skill in the art. FIG. 4 shows a portion of a dashboard that includes a scatterplot, which dashboard is fabricated in accordance with one or more further embodiments of the present invention. As further shown in FIG. 4, directed edges 500 and 510 extend from problem objects testClustor-07 and testCluster-06, respectively, to problem object datastore-32. In accordance with one or more such embodiments, a directed edge indicates dependency of one object on another. For example, if object A depends on object B, a directed edge would begin on object A at a first width and a first color intensity, and the width of the directed edge would become narrower as the directed edge approaches object B and the color intensity of the directed edge would become greater (darker) as the directed edge approaches object B. In accordance with one or more such embodiments, the starting and ending widths and the starting and ending color intensity of directed edges are configurable parameters. As described above, selecting an object by clicking a mouse may also provide a point on the time slider that indicates the time at which the problem for the object was first detected.

Figure 5:
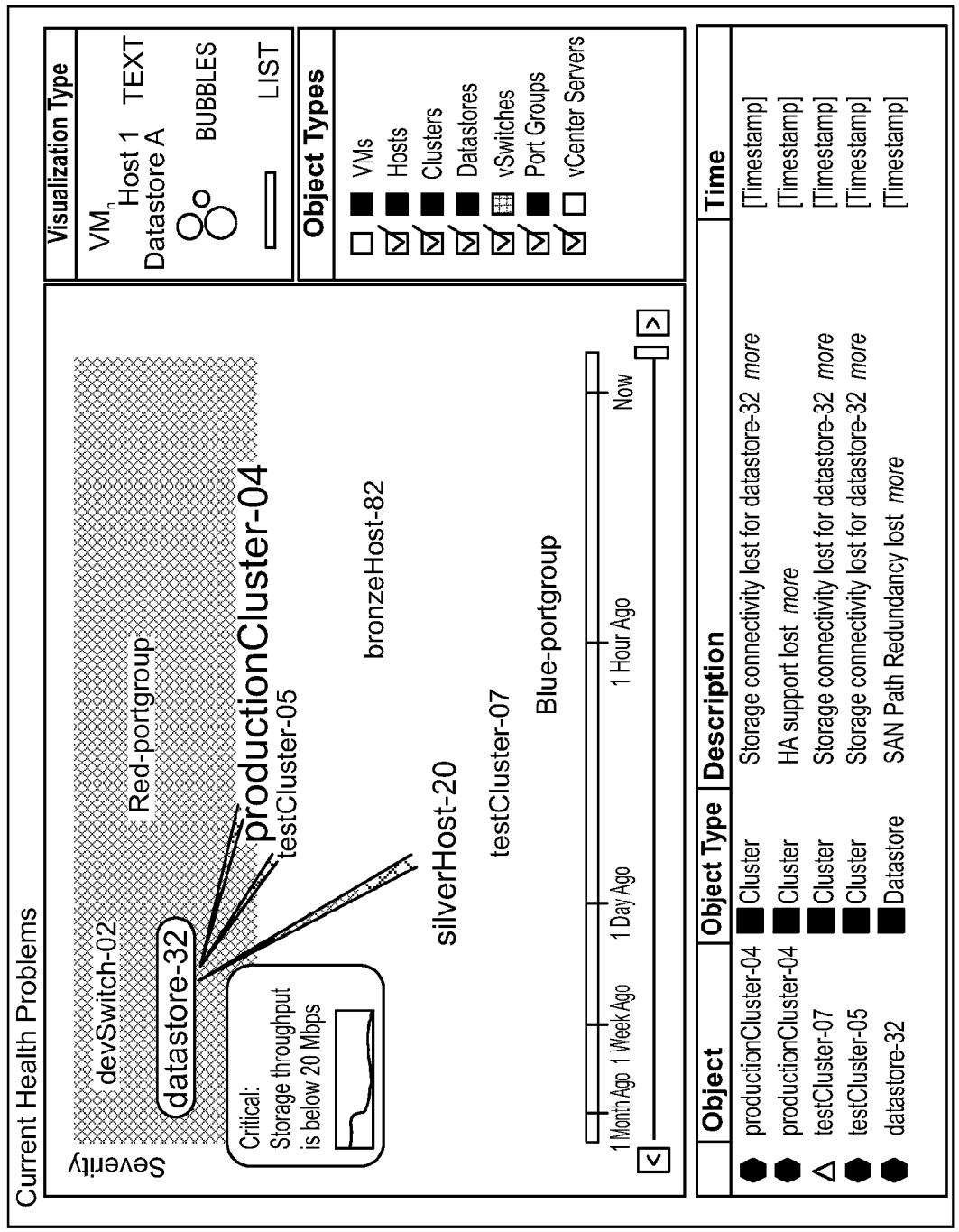
FIG. 5 shows the dashboard of FIG. 2 where a datacenter administrator has selected an object.

In accordance with one or more further embodiments of the present invention, the user may, for example and without limitation, use a cursor to hover over an object, and in response, and in accordance with one or more such embodiments, additional information is displayed (referred to herein as a "tooltip") using any one of a number of methods that are well known to those of ordinary skill in the art. In accordance with one or more such embodiments, the additional information in the display tooltip may include problem metrics obtained from, for example and without limitation, database 108. For example and without limitation, the metrics to be displayed for a particular type of object would be configurable parameters that would be determined at installation and would be configurable by a user using the UI in accordance with any one of a number of methods that are well known to those of ordinary skill in the art. For example and without limitation, as shown in FIG. 5, the additional information may include a performance chart (for example and without limitation, storage throughput over time) showing a performance metric in the health definition whose violation caused the problem, along with related text. Thus, in accordance with one or more such further embodiments, causing the cursor to hover over an object would cause the display of metrics whose values differ from predetermined acceptable ranges by predetermined amounts. Such metrics may include, for example and without limitation, disk I/O in MBps, CPU utilization in percent of capacity, and so forth.

In accordance with one or more embodiments of the present invention, a background of the scatterplot may be divided into several regions where the backgrounds are displayed in different colors using any one of a number of methods that are well known to those of ordinary skill in the art, which areas correspond to different degrees of problem severity. In accordance with one or more such embodiments, the several regions are displayed in one background color but having different intensities in the different regions. Alternatively, the background could reflect an intensity gradient over the scatterplot. In further addition, one or more embodiments are combinations of one or more of the foregoing. For example and without limitation, as shown in FIG. 2, the upper portion of the scatterplot corresponding to more severe problems has a first intensity background color and the lower portion of the scatterplot corresponding to less severe problems has a second intensity of background color. The number of regions, the background colors, the intensities, and the gradients are configurable parameters that may be configured using any one of a number of methods that are well known to those of ordinary skill in the art. For example and without limitation, the scatterplot may be divided into two regions, yellow and red, which mark areas for medium and high severity problems, respectively.

In accordance with one or more embodiments of the present invention, a "stacked chart" is added to the display shown in FIG. 3 (for example and without limitation, under the scatterplot and above the time slider), which stacked chart displays the number of problem objects displayed on the scatterplot as a function of time. Specifically, at a particular point along the horizontal axis (the point along the horizontal axis corresponds to a particular time, for example, vertical line 280 corresponds to the present time) the height of the stacked chart indicates the number of problem objects appearing on the scatterplot at that particular time. In accordance with one or more such embodiments, the stacked chart shows the number of problem objects for each time interval displayed on the scatterplot. As shown in FIG. 3, in accordance with one or more embodiments of the present invention, the stacked chart includes white portion 290 whose height represents the number of problem objects displayed in white on the scatterplot and gray portion 300 whose height represents the number of problem objects displayed in white on the scatterplot. In accordance with one or more embodiments of the present invention, the results of filtering (described above) will also be reflected in the stacked chart displayed, for example and without limitation, below the scatterplot. A datacenter administrator may use the stacked chart to identify areas of the scatterplot or times where problems first appeared by looking for changes in the stacked chart (for example, if a number of problems appeared at a particular time, one would see an increase in the height of the stacked chart).

In accordance with one or more embodiments of the present invention, a list of alerts is displayed along with the scatterplot using any one of a number of methods that are well known to those of ordinary skill in the art, which list of alerts details the specific problems afflicting the displayed objects. For example and without limitation, FIG. 2 shows a list of alerts that are displayed beneath the scatterplot. For example and without limitation, an alert would identify an object, the object type (for example, a server, a datastore and so forth), a description of the problem, and a time stamp indicating when the problem was detected.

In accordance with one or more embodiments of the present invention, the scatterplot is displayed in conjunction with one or more toolbars using any one of a number of methods that are well known to those of ordinary skill in the art. In accordance with one or more such embodiments, one toolbar may be used to change the visualization type using any one of a number of methods that are well known to those of ordinary skill in the art (for example and without limitation, objects are displayed using text (and color of the text), objects are displayed as particular shapes such as, for example and without limitation, circle, rectangle, hexagon, triangle (and the color of the shapes), and one toolbar may be used to hide or reveal objects by type using any one of a number of methods that are well known to those of ordinary skill in the art (for example and without limitation, a list of objects is displayed and a checkbox is used to indicate which of the objects are to be displayed in the scatterplot). For example and without limitation, refer to top right-hand panel 410 of FIG. 2.

In accordance with one or more embodiments of the present invention, a user can filter the display, for example and without limitation, by object type, problem severity, text used to identify objects and so forth. In accordance with one or more such embodiments, filter criteria may be specified by a user using the UI in accordance with any one of a number of methods that are well known to those of ordinary skill in the art. Further, in accordance with one or more such embodiments, the filtering can be dynamic so that the display reflects criterion matching results as soon as the user enters a search criterion as opposed to having to enter all filter criteria (and selecting a "submit button") before the display reflects criteria matching results. In addition, in accordance with one or more such embodiments, filter criteria may be specified so as to apply to tabular data (such as alerts) displayed, for example and without limitation, below the scatterplot. For such cases, the tabular display would be "in sync" with the scatterplot, i.e., if the user filters something out of the scatterplot, it would also be filtered out of the tabular display.

In accordance with one or more embodiments of the present invention, a scatterplot is updated when one or more of the following occurs: a problem with an object is detected, a problem severity changes, a problem severity falls below a user-configurable value (for example and without limitation, the object becomes healthy), time changes by a user-configurable amount (for example and without limitation, the amount may equal a time interval along the time axis of the scatterplot), a time indicator on a time slider is moved, or a problem importance changes.

Method of Using the Visualization

The following illustrates a method of using the inventive visualization to detect and resolve a problem in a datacenter. In other words, it shows how a datacenter administrator can detect a problem, and explore the problem space using a display with a scatterplot and a list of alerts.

Consider the following problem scenario where resources in three server clusters, including a production server cluster (i.e., a group of servers that are running VMs used to serve customers in production) are impacted. The underlying cause of the problem is that a misconfigured storage array was overloaded due to a sudden spike in traffic from multiple sources.

A first step in the method entails detecting the problem. To do this, and in accordance with one or more embodiments of the present invention, the datacenter administrator accesses VS 120 and, in response, VS 120 provides a display (refer to FIG. 2) on the datacenter administrator's interactive device (for example and without limitation, a laptop computer) over a private network connection, which display includes a scatterplot of "unhealthy" objects together with a list of alerts that detail the specific problems afflicting the displayed objects. In accordance with one more such embodiments, the scatterplot has two background colors (yellow and red, as described above), and as described above, the larger the object is (as displayed on the scatterplot) and the higher it is (as displayed on the scatterplot) relative to the upper left hand corner of the scatterplot, the higher is the priority of the problem.

As shown in the example of FIG. 2, datastore-32 is relatively high in the upper left-hand corner of the scatterplot. Note: other "unhealthy" objects are also displayed on the scatterplot, some of which unhealthy may have problems that relate to the problem with datastore-32.

The next step may entail obtaining more information regarding datastore-32. To do this, in accordance with one or more embodiments of the present invention, the datacenter administrator uses a cursor provided by VS 120 in accordance with any one of a number of methods that are well known to those of ordinary skill in the art to select an object, in this case datastore-32, by clicking a mouse when the cursor appears over the object. In response, (as described above and as shown in FIG. 5), and in accordance with one or more such embodiments, VS 120 provides an overlay on the scatterplot of directed edges connecting datastore-32 with other objects displayed on the scatterplot (where the directed edges indicate a relationship between datastore-32 and the other objects displayed in the manner described above). In addition, by causing the cursor to hover over the object additional information is provided in a display tooltip in the manner described above. The additional information is: (a) a chart showing a problem metric obtained from database 108 (for example, in this case the problem metric is storage throughput in MBps); and (b) text relating to the problem. As shown in FIG. 5, three server clusters are dependent on datastore-32. In this case, the datacenter administrator would infer that all the problems are probably related.

The next step may entail further exploring the problem space. To do this, and in accordance with one or more embodiments of the present invention, the datacenter administrator hovers over the other objects to obtain a tooltips displaying more information regarding other objects in the scatterplot.

The next step may entail "rewinding" to a time at which the problem was first detected. To do this, in accordance with one or more embodiments of the present invention, the datacenter administrator uses a time slider on the display underneath the scatterplot. We can also use the stacked chart to identify areas/times of where problems first appeared by looking for changes in stacked chart. Next, in accordance with one or more embodiments of the present invention, the datacenter administrator drags the slider time indicator to the left, and VS 120 shifts the whole "cloud" of objects right, and hence, back in time (as described above and shown in FIG. 6).

Figure 6:
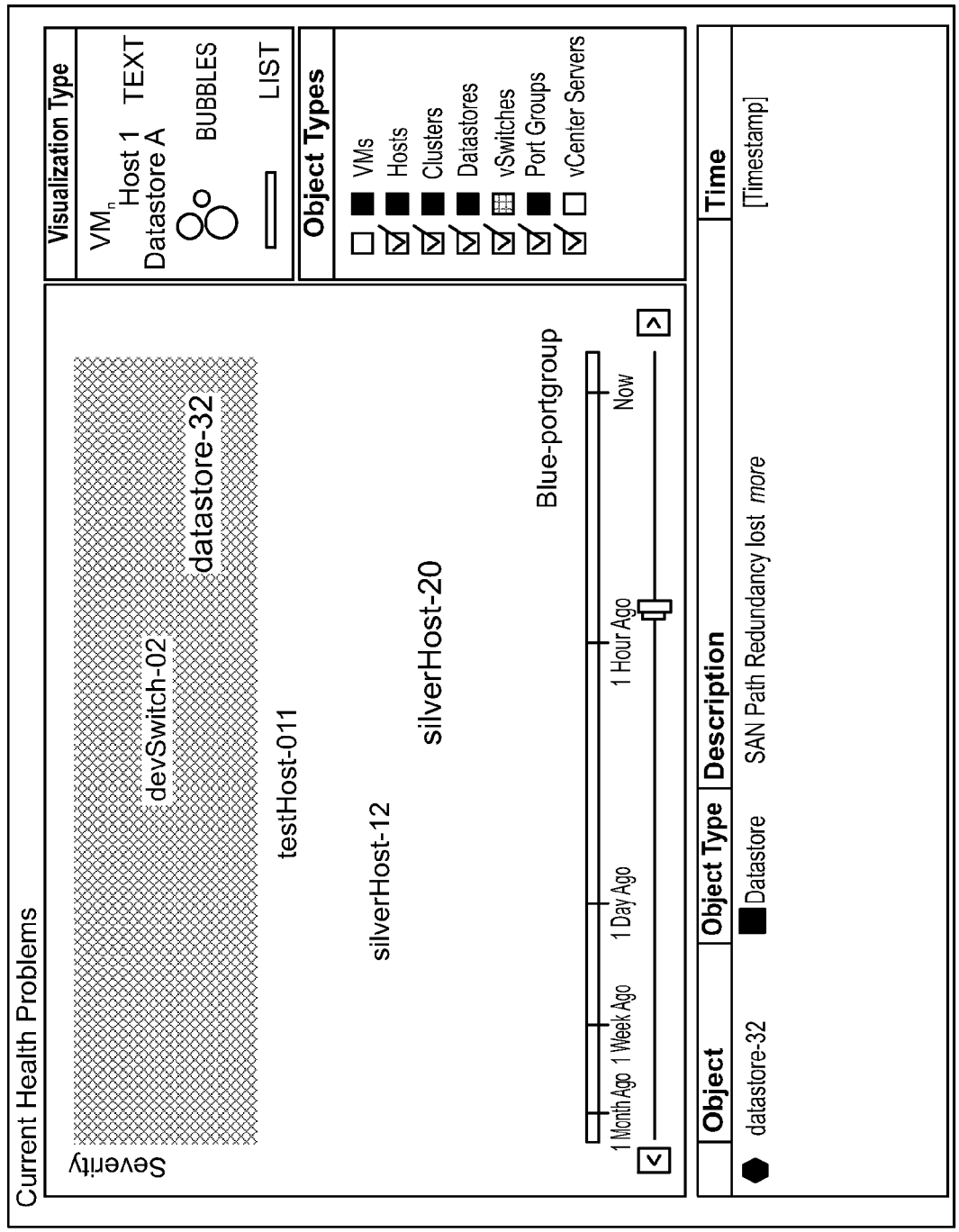
FIG. 6 shows the dashboard of FIG. 2 at a prior time.
Figure 7:
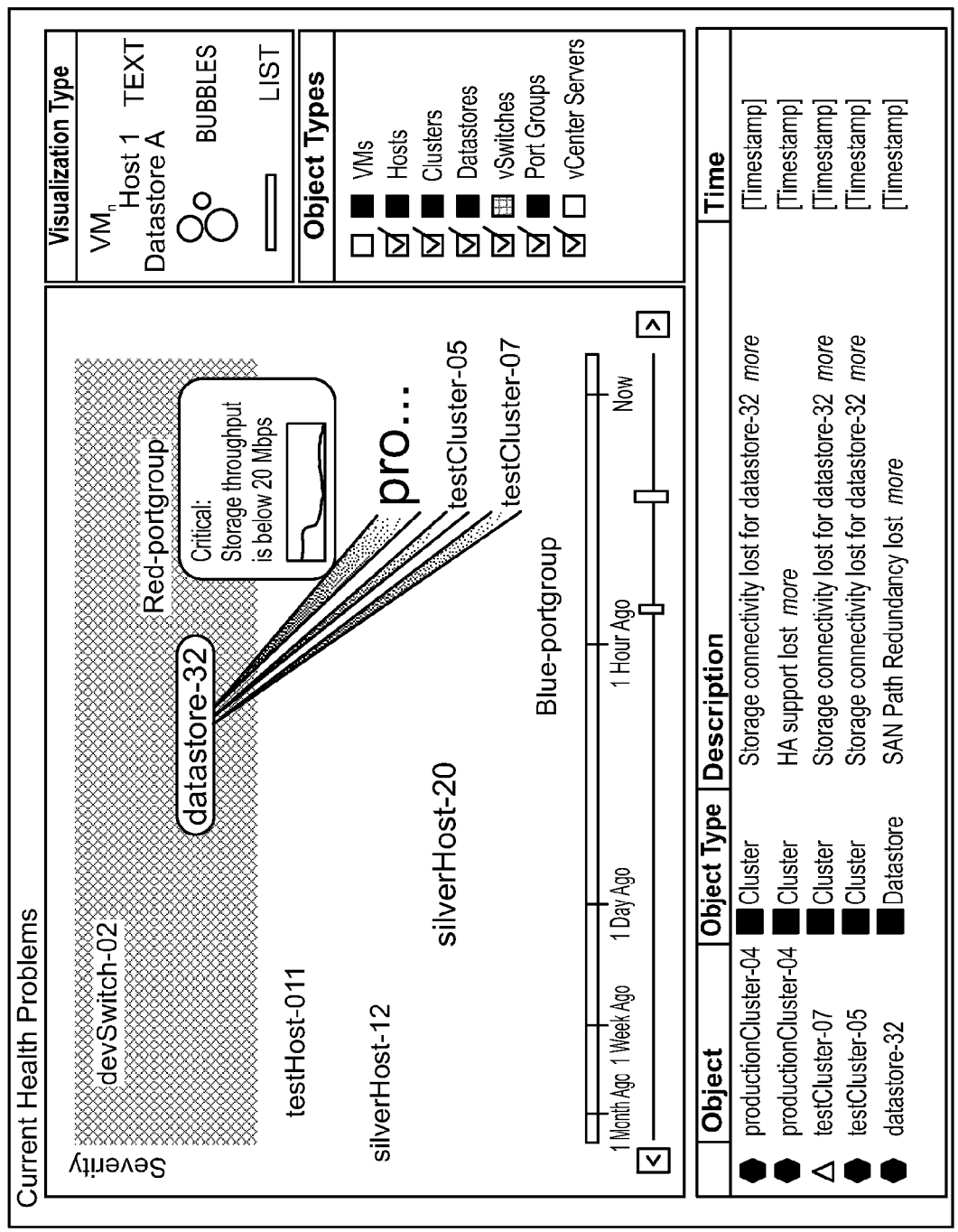
FIG. 7 shows the dashboard of FIG. 2 at a time more recent than the time represented in FIG. 6.

The next step may entail replaying to verify the cause of the problem and its impact. As shown in FIG. 6, replay starts with only a problem with datastore-32 (with only one related alert in the list of alerts, and no related impacted objects. To replay, in accordance with one or more embodiments of the present invention, the datacenter administrator moves the slider time indicator to the right, and (as described above) in response, as time progresses, VS 120 causes the production server cluster, as well as the other two server clusters, to show alerts that appear on the scatterplot, see FIG. 7. In light of this behavior, the datacenter administrator can conclude that the problems with the related objects started in the datastore area.

The next step may entail drilling down to further understand the problem. For example and without limitation, the datacenter administrator may use DMS 110 to: (a) determine who the owners of the VMs are, and then notify the owners to investigate what might have caused the traffic increase as described above; and (b) drill down to the storage array configuration and redistribute the VMs among several other datastores to reduce the load in accordance with any one of a number of methods that are well known to those of ordinary skill in the art.

One or more embodiments of the present invention, including embodiments described herein, may employ various computer-implemented operations involving data stored in computer systems. For example. these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing. identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments of the present invention, including embodiments described herein, may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory.

random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Many changes and modifications may be made to the description set forth above by those of ordinary skill in the art while remaining within the scope of the invention. In addition, apparatus, methods and mechanisms suitable for fabricating one or more embodiments of the present invention have been described above by providing specific, non-limiting examples and/or by relying on the knowledge of one of ordinary skill in the art. Apparatus, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described apparatus, methods and mechanisms.

As such, the scope of the invention should be determined with reference to the appended claims along with their full scope of equivalents. Accordingly, the described embodiments are to be considered as exemplary and illustrative and not restrictive, and the scope of the claims is not to be limited to details given herein, but may be modified within the scope and equivalents of the claims. The claim elements and/or steps do not imply any particular order of operation, unless explicitly stated in the claims.

Many changes and modifications may be made to the description set forth above by those of ordinary skill in the art while remaining within the scope of the invention. In addition, methods, and mechanisms suitable for fabricating embodiments of the present invention have been described above by providing specific, non-limiting examples and/or by relying on the knowledge of one of ordinary skill in the art. Methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described materials, methods or mechanisms. As such, the scope of the invention should be determined with reference to the appended claims along with their full scope of equivalents.

In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for visualizing the health of datacenter objects which comprises:
    displaying various datacenter objects on a scatterplot of a dashboard, wherein the various datacenter objects are identified on the scatterplot using characters on the scatterplot, the characters including at least one alphanumeric character;

wherein:
    one axis of the scatterplot corresponds to problem severity from a least severe problem to a most severe problem in an increasing manner and another axis of the scatterplot corresponds to time, the problem severity of at least one datacenter object of the various datacenter objects being determined by a metric that relates to an amount by with a state of the at least one datacenter object differs from a reference state of the at least one datacenter object when the at least one datacenter object is operating in accordance with predetermined parameters, wherein a first datacenter object has a higher problem severity than a second datacenter object if the first datacenter object have more inoperative components than the second datacenter object, wherein the first datacenter object is a first virtual machine with insufficient memory and processing power and the second datacenter object is a second virtual machine with insufficient memory or processing power, and wherein the first virtual machine has a higher problem severity than the second virtual machine; and
    each datacenter objects on the scatterplot represents a single object of a datacenter, and has a particular position along the one axis and another particular position along the another axis, and
    wherein the displaying the datacenter objects on the scatterplot of the dashboard is executed using a computer with a display.

2. The method of claim 1 wherein:
    a size of an object on the scatterplot corresponds to problem importance, wherein the problem importance is indicative of how critical the object is to the operation of the datacenter.

3. The method of claim 2 wherein the first axis is a vertical axis and the another axis is a horizontal axis.

4. The method of claim 3 wherein a bottom of the vertical axis corresponds to the least severe problem.

5. The method of claim 2 wherein the time axis is scaled.

6. The method of claim 5 wherein the time axis is logarithmically scaled.

7. The method of claim 2 wherein an object is first displayed on the scatterplot when a problem is detected.

8. The method of claim 7 wherein a position of an object vis-à-vis the time axis provides a measure of problem duration.

9. The method of claim 7 which further comprises:
    updating the scatterplot when one or more of the following occurs: a problem with an object is detected, a problem severity changes, a problem severity falls below a predetermined value, time changes by a predetermined amount, a time indicator on a time slider associated with the scatterplot is moved, or a problem importance changes.

10. The method of claim 9 which further comprises:
    selecting a problem object on the scatterplot; and
    in response to the selecting of the problem object on the scatterplot, displaying on the time slider an indication that identifies a detection time when the problem with the object was first detected.

11. The method of claim 10 which further comprises:
    in response to an activation of a time player displayed on the dashboard, moving a time indicator of the time slider to the detection time.

12. The method of claim 11 which further comprises:
    moving the time indicator from the detection time to a more recent time.

13. The method of claim 12 wherein:
the time axis is logarithmically scaled; and
time movement associated with movement of the time indicator moves at a constant rate.

14. The method of claim 12 wherein:
the time axis is logarithmically scaled; and
the time indicator moves at a constant rate of speed.

15. The method of visualizing of claim 2 which further comprises:
displaying a background of the scatterplot so that two or more regions of the background are displayed in different colors, in different shades of color, or different intensities of color, or in an intensity gradient over the scatterplot.

16. The method of visualizing of claim 2 which further comprises:
selecting one or more types of datacenter objects to display in the scatterplot.

17. The method of claim 16 which further comprises:
displaying object types in a toolbar on the dashboard.

18. The method of claim 17 which further comprises:
in response to a selection of one or more object types in the toolbar, displaying objects corresponding to the selected object types.

19. The method of claim 2 where a type of problem corresponds to a type of display object.

20. The method of claim 2 which further comprises:
filtering the display using user specified filter criteria.

21. The method of claim 20 wherein the filter criteria include one or more of object type, problem severity, or text used to identify objects.

22. The method of visualizing of claim 2 which further comprises:
displaying one or more indications of related problem objects on the scatterplot in response to a user selecting a problem object on the scatterplot.

23. The method of claim 22 wherein an indication of a related problem object is a directed edge from one problem object on the scatterplot to a related problem object on the scatterplot.

24. The method of claim 2 which further comprises:
displaying a tooltip in response to a user selecting a problem object.

25. The method of claim 24 wherein selecting comprises hovering over a problem object.

26. The method of claim 24 wherein:
the tooltip includes a display of a performance metric.

27. The method of claim 2 which further comprises:
displaying a list of alerts on the dashboard.

28. The method of claim 2 which further comprises:
displaying a stacked chart on the dashboard, which stacked chart displays a number of problem objects displayed on the scatterplot as a function of time.

29. The method of claim 1 which further comprises:
displaying a problem object as one of the following: text or a geometric shape.

30. The method of claim 1 which further comprises:
isolating problem objects on the scatterplot by selecting a target problem object on the scatterplot and moving overlapping problem objects on the scatterplot away from the selected target problem object while it is selected.

31. The method of claim 30 which further comprises:
returning the moved objects back to their original position on the scatterplot when the target is no longer selected.

32. The method of claim 1 wherein:
a size of characters of an object on the scatterplot corresponds to problem importance, wherein the problem importance is indicative of how critical the object is to the operation of the datacenter.

33. The method of claim 1, wherein the metric for the problem severity of the at least one datacenter object is resource utilization percentage of the at least one datacenter object.

34. The method of claim 1, wherein the metric for the problem severity of the at least one datacenter object is performance of the at least one datacenter object.

35. The method of claim 1, wherein the first datacenter object is a first virtual machine that is unresponsive and the second datacenter object is a second virtual machine that is working, but with degraded performance, and wherein the first virtual machine has a higher problem severity than the second virtual machine.

36. The method of claim 1, wherein the first datacenter object is a first datastore with a first space utilization percentage and the second datacenter object is a second data store with a second space utilization percentage that is less than the first space utilization percentage, and wherein the first datastore has a higher problem severity than the second datastore.

37. The method of claim 1, wherein the first datacenter object is a first host server and the second datacenter object is a second host server, the first host server having at least one inoperative network interface more than the second host server, and wherein the first host server has a higher problem severity than the second host server.

38. A computer system including visualization software and a display, which visualization software causes the computer system to carry out a method comprising:
displaying various datacenter objects on the display on a scatterplot of a dashboard, wherein the various datacenter objects are identified on the scatterplot using characters on the scatterplot, the characters including at least one alphanumeric character;
wherein:
one axis of the scatterplot corresponds to problem severity from a least severe problem to a most severe problem in an increasing manner and another axis of the scatterplot corresponds to time, the problem severity of at least one datacenter object of the various datacenter objects being determined by a metric that relates to an amount by with a state of the at least one datacenter object differs from a reference state of the at least one datacenter object when the at least one datacenter object is operating in accordance with predetermined parameters, wherein a first datacenter object has a higher problem severity than a second datacenter object if the first datacenter object have more inoperative components than the second datacenter object, wherein the first datacenter object is a first virtual machine with insufficient memory and processing power and the second datacenter object is a second virtual machine with insufficient memory or processing power, and wherein the first virtual machine has a higher problem severity than the second virtual machine; and
each datacenter objects on the scatterplot represents a single object of a datacenter, and has a particular position along the one axis and another particular position along the another axis.

39. The computer system of claim 38, the method wherein:
a size of an object on the scatterplot corresponds to problem importance, wherein the problem importance is indicative of how critical the object is to the operation of the datacenter.

40. The computer system of claim 39 which further comprises:
    updating the scatterplot when one or more of the following occurs: a problem with an object is detected, a problem severity changes, a problem severity falls below a predetermined value, time changes by a predetermined amount, a time indicator on the time slider is moved, or a problem importance changes.

* * * * *